(12) United States Patent
Deeds

(10) Patent No.: US 6,308,581 B1
(45) Date of Patent: Oct. 30, 2001

(54) DIFFERENTIAL PRESSURE FLOW SENSOR

(75) Inventor: Michael A. Deeds, Port Tobacco, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/391,605

(22) Filed: Sep. 7, 1999

(51) Int. Cl.$^7$ ........................................................ G01F 1/37
(52) U.S. Cl. ...................... 73/861.52; 73/861.42; 73/181; 73/182
(58) Field of Search ..................... 73/861.42, 861.52, 73/861.58, 861.63, 861.65, 181, 182, 170.14

(56) References Cited

U.S. PATENT DOCUMENTS

| | | |
|---|---|---|
| 3,978,725 | 9/1976 | Hadtke . |
| 4,448,069 | 5/1984 | Gibert . |
| 4,685,093 | * 8/1987 | Gill ........................................ 367/89 |
| 4,920,808 | 5/1990 | Sommer . |
| 5,412,984 | 5/1995 | Okita . |
| 5,515,735 | 5/1996 | Sarihan . |
| 5,583,289 | 12/1996 | Wiggerman et al. . |
| 5,585,557 | * 12/1996 | Loschke et al. ................... 73/170.14 |

* cited by examiner

Primary Examiner—Max Noori
Assistant Examiner—Corey D. Mack
(74) Attorney, Agent, or Firm—Mark Homer

(57) ABSTRACT

The fluid flow meter of the present invention includes a ramp inclined to the surface of a vessel so as to form a recess in the surface. A dynamic port surface extends from the lower end of the ramp to the surface of the vessel. A dynamic port is formed in the surface of the vessel, and a static port is formed in the ramp. The differential pressure between the dynamic and static ports is measured and is related to the flow velocity of fluid over the surface. The inventive flow meter has advantages of reduced drag, reduced likelihood of fouling and reduced likelihood of impact damage compared to conventional flow meters.

25 Claims, 5 Drawing Sheets

DIFFERENTIAL PRESSURE FLOW SENSOR

BACKGROUND OF THE INVENTION

1. Field of the Invention

The present invention relates generally to devices for measuring the speed of fluid flow using pressure differential, and more specifically to devices for measuring the speed of watercraft.

2. Description of the Related Art

A commonly used device for the measurement of the air speed of airplanes or water speed of vessels is the Pitot tube. Typically, a Pitot tube is oriented facing the direction of travel through the fluid (water or air), and is positioned at a distance from the surface of the vessel, so that the Pitot tube is outside the boundary layer of the flow and therefore experiences the full flow. The pressure in the Pitot tube increases as the speed of the fluid passing by the opening of the tube increases. The pressure of the Pitot tube is measured or compared differentially to the pressure in a static tube oriented perpendicularly to the direction of fluid flow to determine the speed.

A related device used in the measurement of fluid flow is the Stanton tube. The Stanton tube is typically mounted on the surface over which the fluid is flowing, and therefore is in the boundary layer. The pressure in the Stanton tube is less than would be observed for a Pitot tube outside the boundary layer, and the Stanton tube must therefore be calibrated for the particular surface where it is mounted. Stanton tubes are generally not used as speedometers for aircraft or water vessels.

While the use of Pitot tubes as speedometers or flow meters is common, Pitot tubes have several drawbacks, especially when used in marine applications. Because they are generally mounted sticking away from the surface of a vessel, Pitot tubes are subject to damage from bumping. Collision with or snagging of flotsam or submerged debris, for example, driftwood, marine animals, or seaweed, can disable a Pitot tube. Airplane Pitot tubes can be damaged while on the ground, or by bird strikes, etc., in the air.

Similarly, Pitot tubes are subject to fouling by particles entering the tube. Bugs, marine life, sediment, etc., may all potentially enter the Pitot tube leading to inaccurate readings or complete failure of the device.

In addition, Pitot tubes inherently impose drag on the vessel to which they are attached. While this drag is not usually a problem for ordinary airplanes or boats, it may well pose a problem is in high performance applications.

The following examples of the conventional art illustrate various speed measuring devices based on sensing fluid pressure. U.S. Pat. No. 3,978,725, to Hadtke, entitled Speedometer Particularly For Water Skis, describes a water ski with a Pitot-tube like device disposed on the underside of the ski. A flexible diaphragm transmits the pressure from a tube opening to a fluid inside the ski, and thereby to a speedometer on the ski. The Pitot-tube like device has the tube opening on a portion of a rib on the underside of the ski.

U.S. Pat. No. 4,448,069, to Gibert, entitled Airspeed Sensing Post For Determining Relative Velocity Of A Fluid And A Carrier, discloses an airspeed sensing post with a static pressure sensing device of a particular shape, such that the measurement of static pressure is not affected by pitch angle. This device uses a standard Pitot tube, and does not solve the problems of Pitot tubes addressed above.

U.S. Pat. No. 4,920,808, to Sommer, entitled Device And Method For Measuring The Flow Velocity Of A Free Flow In Three Dimensions, describes a rotationally symmetrical flow body with at least two sets of peripherally spaced openings in regions of different thickness along the side of the body. The velocity of flow along the body is determined by differences in the static pressure measured in the openings. This device takes the form of a symmetrical flow body probe which presumably is mounted on a vehicle such as an aircraft or rocket in a position to experience the full flow, that is, away from the body of the vehicle. Thus, this device does not solve many of the problems with Pitot tubes described above.

U.S. Pat. No. 5,412,984, to Okita, entitled Vessel Speed Measuring System For The Marine Propulsion Machine, describes a vessel speedometer for a marine propulsion system such as an outboard motor. The design incorporates a Pitot tube pressure intake port in the lower leading edge of the outboard motor. Various designs to prevent fouling of the intake port, including ridges and projections around the intake port, are illustrated. This apparatus is specifically designed for use on a propulsion apparatus, however, and the apparatus requires that the intake port directly face the flow of the water.

U.S. Pat. No. 5,515,735, to Sarihan, entitled Micromachined Flow Sensor Device Using A Pressure Difference And Method of Manufacturing The Same, describes a micromachined flow sensor using a pressure differential. This device is related to Venturi-type devices, and such a device must be placed directly in the fluid flow.

U.S. Pat. No. 5,583,289, to Wiggerman et al., entitled Marine Velocity Detection Device With Channel To Wash Out Debris, describes a marine speedometer in which the pressure sensing orifice is protected by the curvature of a top portion of a tunnel through which the water flows. The overall apparatus must be placed in the direct fluid flow, and is mounted to a transom of the watercraft. This detection device is therefore a relatively bulky appendage to the watercraft.

Based on my reading of the art, I believe that what is needed is a flow meter or speedometer which may be mounted flush on the surface of a vessel so as not to protrude from the vessel as the standard Pitot tube does. Although non-protruding flow meters which directly face the direction of flow are available, as in U.S. Pat. No. 5,583,289, it is often impractical or undesirable to mount a flow detector on the nose of a vessel, that is, on the surface normal to the flow. Thus, I believe that what is needed is a flow meter which moreover may be mounted on a side surface over which the fluid is flowing roughly parallel to the surface.

SUMMARY OF THE INVENTION

It is therefore an object of the present invention to provide an improved fluid flow meter.

It is a further object of the invention to provide an improved flow speedometer on a vessel.

It is a still further object of the invention to provide a flow meter which has reduced drag.

It is a yet further object of the invention to provide a flow meter which is more resistant to impact damage.

It is another object of the invention to provide a flow meter which is more resistant to fouling.

It is yet another object of the invention to provide a flow meter which can be mounted flush on the side of a vessel.

To achieve the above objects, the present invention provides a differential pressure flow meter for a vessel which includes a longitudinal recess angled to the surface of the vessel so as to form a ramp, and a dynamic port surface angled extending from the floor of the ramp to the surface. A dynamic port is formed in the dynamic port surface and is connected through a dynamic port channel to a pressure transponder. Optionally, a static port may be provided in the ramp or from the surface of the vessel, and the static port may be connected through a static port channel to the pressure transponder which is used to determine the differential pressure between the dynamic and static ports. The pressure in the dynamic port channel or differential pressure between the dynamic and static port channels is related to the flow rate of fluid across the surface of the vessel.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
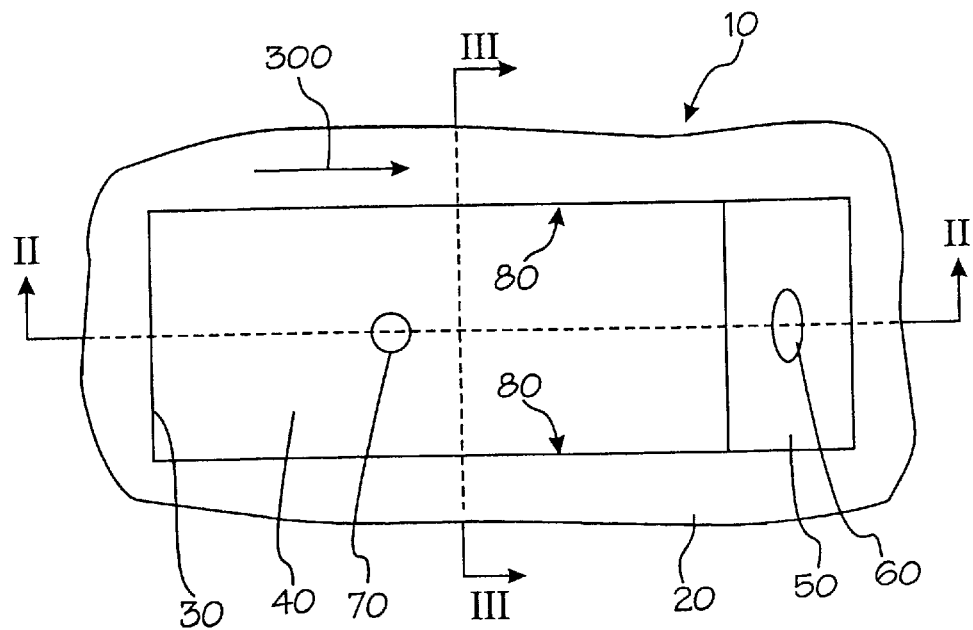
FIG. 1 is a top plan view of an embodiment of the flow meter of the present invention.
Figure 2:
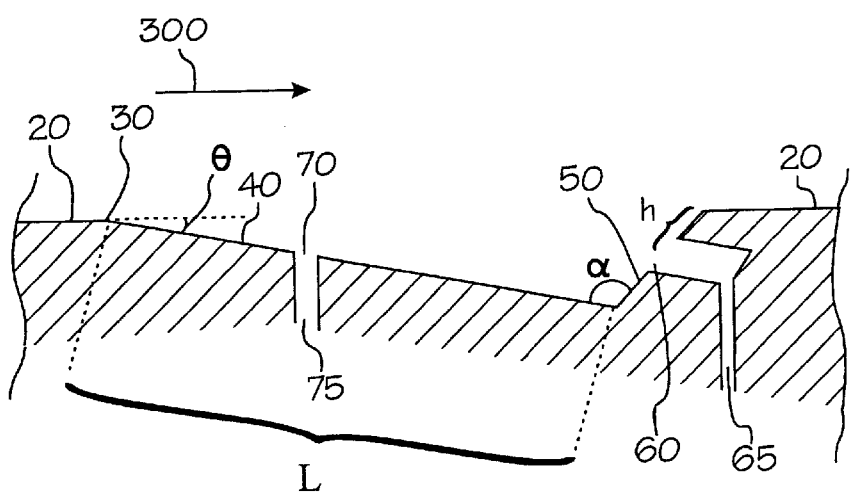
FIG. 2 is a transverse cross-sectional view taken through II—II in FIG. 1.

Referring now to the drawings, an embodiment illustrating the general principles of the present invention is shown in FIGS. 1 and 2, where FIG. 1 is a top plan view and FIG. 2 is a longitudinal cross-sectional view. As shown in FIG. 1, the inventive device is installed in a region 10 of the surface 20 of a vessel. The vessel can be any object moving through a fluid, or around which a fluid is moving, such as a boat, airplane, land vehicle, torpedo, water flow meter, buoy, etc. The approximate direction of fluid flow across surface 20 of the vessel is indicated by arrow 300. The device is formed in a recess in surface 20. This recess begins at leading edge 30, and is defined in this embodiment by walls 80, ramp 40, and dynamic port surface 50. Thus the ramp extends from the surface and is inclined to the surface to form the recess. Dynamic port surface 50 therefore extends from the lower end of the ramp to the surface.

Formed in ramp 40 is static port 70 connected to static port channel 75. Formed in dynamic port surface 50 is dynamic port 60, which is connected to dynamic port channel 65. Dynamic port 60 is therefore recessed relative to surface 20 of the vessel. Dynamic port 60 is preferably cylindrical, with the cylindrical axis oriented roughly parallel to ramp 40. Dynamic port 60 is connected to dynamic port channel 65 which is in turn typically connected to a mechanical or electronic pressure transducer (not shown). The pressure in the dynamic port channel, analogously to the pressure in a Pitot tube, is related to the speed of fluid flow over the vessel. For situations in which the static pressure is not constant, such as vessels whose altitude or depth is varying (for example airplanes or submarines), the pressure differential between the dynamic port channel and the static port channel is measured and this value is related to the speed of the vessel.

Figure 3A:
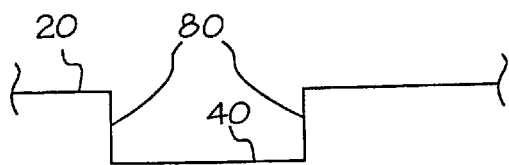
FIG. 3(a) is a longitudinal cross-sectional view taken through III—III in FIG. 1, and FIGS. 3(b) through (f) are corresponding cross-sectional views of alternative embodiments of the invention.
Figure 3B:
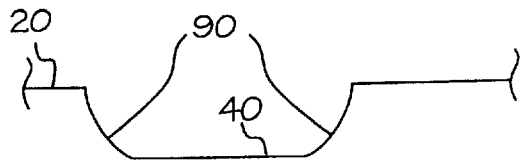
Figure 3C:
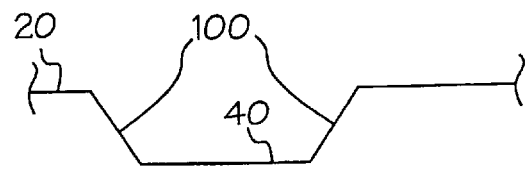
Figure 3D:
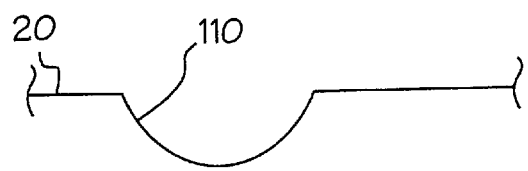
Figure 3E:
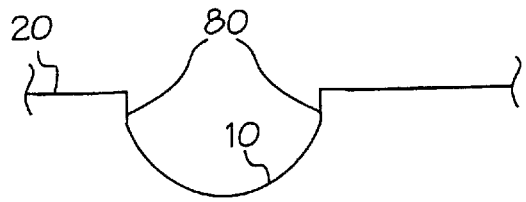
Figure 3F:
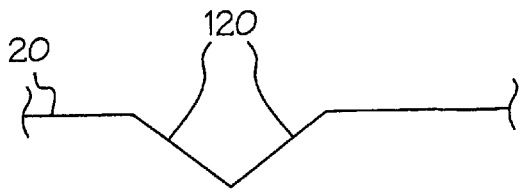

The embodiment of the invention shown in FIGS. 1 and 2 has vertical walls 80, as shown in transverse cross-section in FIG. 3(a). However, many possible shapes of the recess will function, and several alternative embodiments are shown in FIGS. 3(b) through (f). The ramp may be a single curved floor surface, or the ramp may have two side walls. In the embodiment of FIG. 3(b), ramp 40 is flat, but walls 90 are curved and concave toward the exterior. In the embodiment shown in FIG. 3(c), ramp 40 is flat, and walls 100 are angled from the vertical so as to slope into the recess. In the embodiment shown in FIG. 3(d), the ramped portion of the recess is formed of a portion of a cylinder, and floor 110 is a circular section. In the embodiment shown in FIG. 3(e), the recess is formed with vertical wall 80 and curved floor 10. In the embodiment shown in FIG. 3(f), the recess is formed by two angled walls 120.

Figure 4A:
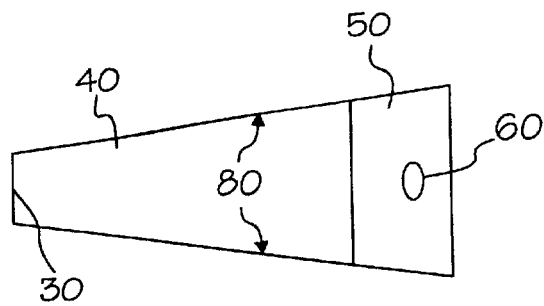
FIGS. 4(a) and (b) are top plan views of alternative embodiments of the invention.
Figure 4B:
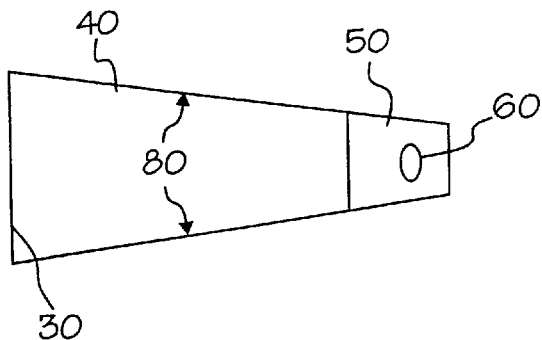

Likewise, the embodiment of the invention shown in FIGS. 1 and 2 has walls 80 which are parallel. An alternative embodiments is shown in FIG. 4(a) in which walls 80 diverge from leading edge 30 to dynamic port surface 50, and in another embodiment shown in FIG. 4(b) walls 80 converge from leading edge 30 to dynamic port surface 50. Also, since the bottom of the ramp descends from the vehicle surface, for some wall shapes, for example cylindrical walls, the pattern of intersection of the walls with surface 20 may appear to converge or diverge in an overhead plan view.

It will readily be appreciated that various combinations of the transverse cross-sections of FIG. 3 and the converging or diverging walls of FIG. 4 are possible. Design selection may be prompted by the material and production method of the device. For example, if the device is made of metal and is to be machined, it may be easiest to drill the recess, and a cylindrical section such as in FIG. 3(d) may result. If the device is cast or molded, a greater variety of combinations may be readily achievable. It is to be understood that the exact shape of the device may be optimized by one skilled in the art, but that the present invention embraces a wide variety of designs.

The performance of the device will be affected by the value of various design parameters. Four important parameters are shown in FIG. 2. Angle θ represents the angle of descent of ramp 40 of the recess relative to surface 20 of the vessel. L is the length of ramp 40 from leading edge 30 to dynamic port surface 50. Angle α is the angle between dynamic port surface 50 and ramp 40. Distance h is the distance along dynamic port surface 50 from surface 20 to the center of dynamic port 60.

It will be appreciated that the these parameters are not entirely independent of each other. It is essential for the device that the dynamic port 60 be recessed below surface 20, and the distance to which dynamic port 60 is recessed, given by parameter h, is limited by the depth of dynamic port surface 50. The depth of dynamic port surface 50 is related geometrically to the angles θ and α and length L. In particular, if θ is small, a larger value of L is necessary to achieve the depth below surface 20 than with a larger value of θ.

Preferably, in devices of the present invention, the value of θ will be in the range of greater than 0° to approximately 30°, and more preferably in the range of greater than 0° to approximately 7°. The value of θ must be greater than 0°, or else there is no recess. However, very low values of θ may be used so long as L is great enough to allow sufficient depth of recess to position the dynamic port below surface 20. Values of angle α are preferably in the range of approximately 75 to 135°, and more preferably in the range of approximately 90 to 110°.

Figure 5A:
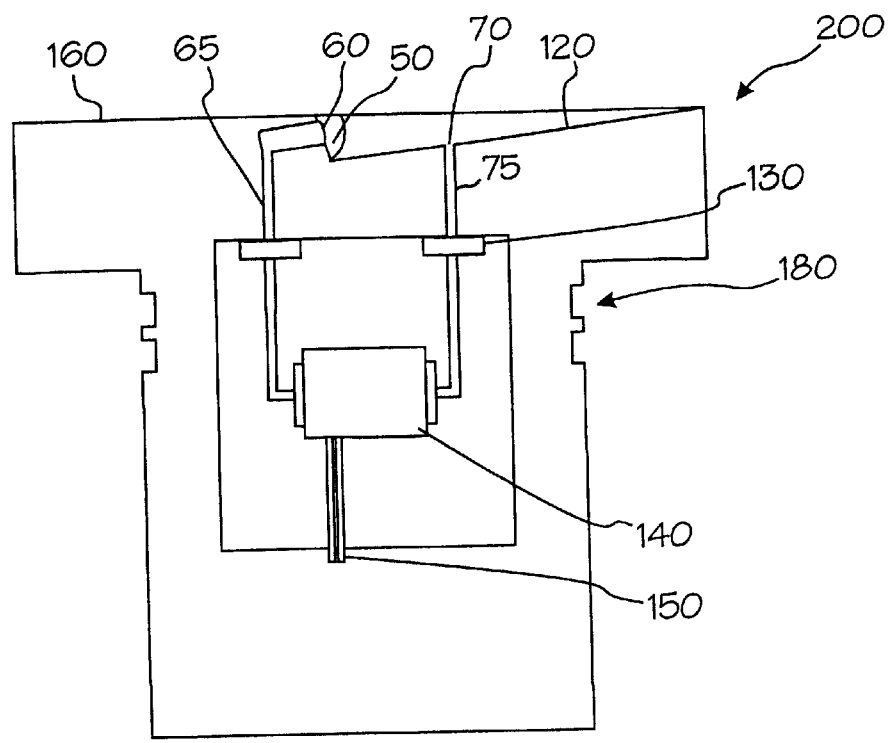
FIGS. 5(a) and (b) are cross-sectional and perspective views of a device incorporating the principles of the present invention.
Figure 5B:
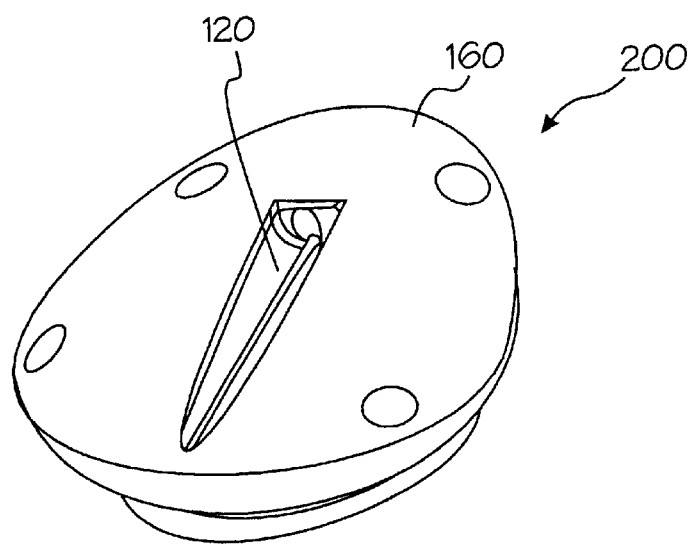

The fluid flow measuring device of the present invention may be designed as an integral part of the surface of the vessel. Alternatively, it may be desirable to incorporate the device in a unit which can be installed in the vessel An example of such a unit is shown in FIG. 5. Flow meter 200 of FIG. 5 can be seen to be of general cylindrical shape, with a cross-section along the cylindrical axis shown in FIG. 5, and the housing of the flow meter is designed to be installed in a complementary hole formed in the surface a vessel (not shown). Top surface 160 of flow meter 200 is curved to match the curvature of the surface of the vessel and is flush with the surface of the vessel when flow meter 200 is installed. Flow meter 200 has a recess including ramp 120, dynamic pressure port surface 50, dynamic port 60 and static port 70 as described previously. Dynamic and static port channels 65 and 75 are connected through seals 130 to differential pressure sensor 140, which is a micromachined diaphragm with embedded piezoresistive sensing elements. Electrical leads 150 transmit the electrical output of sensor 140 to a remote location, typically inside the vessel. Flow meter 200, designed for use in water, has annular grooves 180 for retaining O-rings for providing a waterproof seal of the device into the vessel.

In principle, mechanical or electronic devices may be used to measure the pressure in the dynamic port channel or the differential pressure between the dynamic and static port channels. In practice, preferably an electronic transducer, as known in the art, will be used. The electronic output of the transducer may be output in an analog fashion and may be processed in an analog fashion so as to display the fluid flow speed or the speed of the vessel. Alternatively, the electronic output may be digitized and input to a microprocessor and digitally processed to allow digital display of the speed.

It will also be appreciated by one skilled in the art that the flow meter of the present invention may be modified to accommodate situations which commonly arise in fluid flow measurement. For example, FIG. 1 illustrates the case where the direction of fluid flow is parallel to the longitudinal direction of ramp 40. A flow meter of the present invention used as a vehicle speedometer would generally be designed to orient the device in this way. However, the present invention could also be used in a flow meter, and in such a case the direction of flow might vary; that is, there may be cross-flow. Moreover, in some vehicles, there may be situations in which the direction of fluid flow across the surface changes direction.

Figure 6:
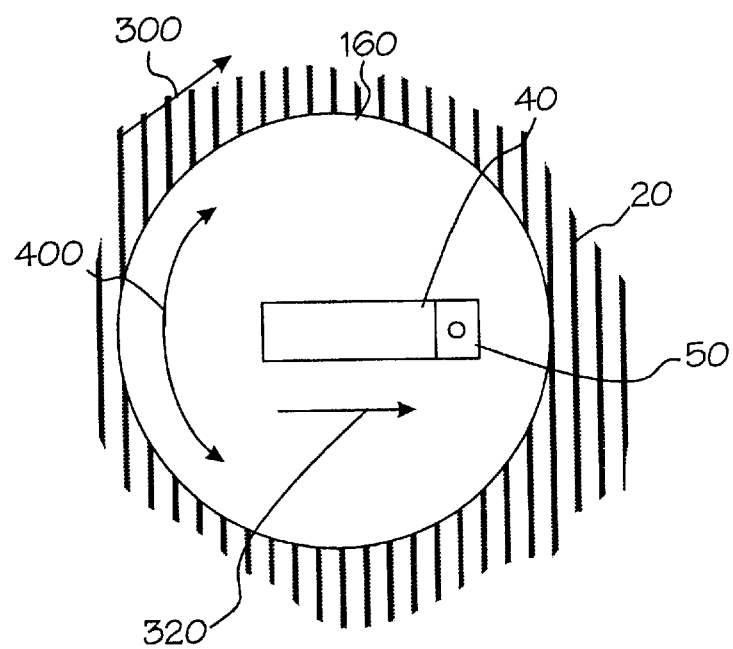
FIG. 6 is an alternative embodiment of the present invention.

In FIG. 6, an embodiment of the invention is shown which compensates for changes of direction in fluid flow. The flow meter, including ramp 40 and dynamic port surface 50, is formed in a circular unit mounted such that surface 160 of the circular unit is flush with surface 20 of the vessel, and is moreover mounted rotatably along the axis of the circular unit as shown by arrow 400. Arrow 320 illustrates the longitudinal direction of ramp 40, shown in FIG. 6 as different from fluid flow direction 300. The circular unit also incorporates a drag element (not shown) such that when the fluid is flowing, the circular unit will tend to "weathervane" so as to align the direction of the ramp 320 with fluid flow direction 300. When these directions are aligned, the device will indicate the correct fluid flow rate in direction 300. A device could be incorporated to indicate the angular position of the servo ramp.

Alternatively, it will be appreciated that it is possible, for example, to incorporate two fixed flow meters of the present invention oriented orthogonally to each other, to indicate the two-dimensional flow velocity across the surface of the vessel.

In addition to the device embodiments of the present invention, the invention may also be generally expressed as a method for determining the velocity of fluid flow over a surface of an object. First, it is necessary to provide a ramp inclined into the surface so as to form a recess and to provide a dynamic port surface and a dynamic port as described in the above embodiments. In addition, a static port may be provided in the ramp or elsewhere on the object surface for measurement of the static pressure. Next, the dynamic pressure is measured as a function of known fluid flow velocity over the surface of the object. Alternatively, if a static port is provided, the pressure differential between the dynamic and static ports may be measured. In this way, a calibration is obtained between the dynamic pressure or differential pressure and the flow velocity. Finally, any flow velocity may then be determined from the dynamic pressure or the differential pressure using this calibration. Using this method, flow velocity may be measured in any surface which can be modified to provide the recess and measurement means.

The following Example describes test results for an exemplary embodiment of the above invention which has been reduced to practice, and the invention is not limited to this embodiment.

EXAMPLE

Figure 7:
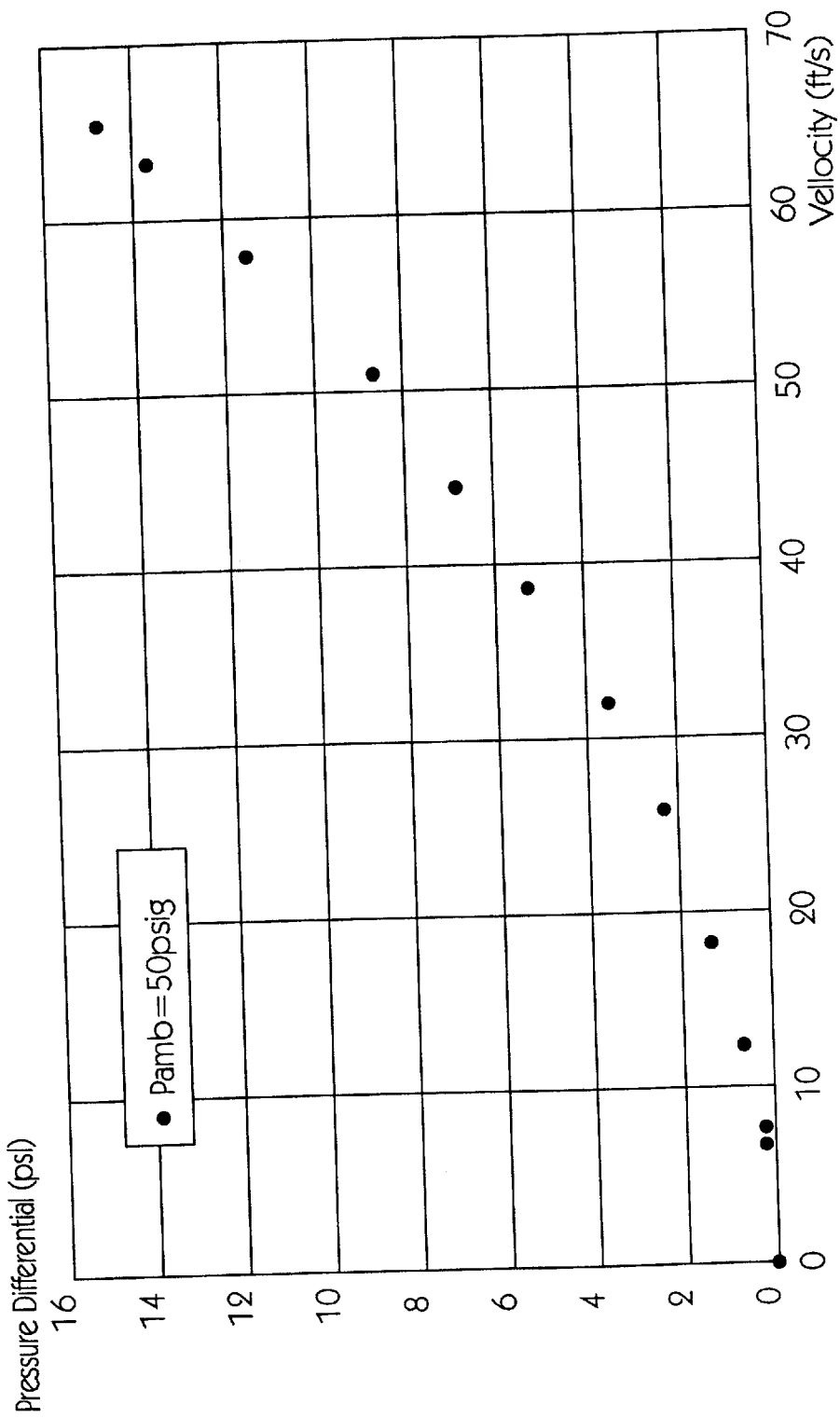
FIG. 7 is a plot of differential pressure versus flow velocity for an Example of the present invention.

An Example of a flow meter of the general design shown in FIG. 5 was constructed of aluminum, with approximate overall diameter of 2.5 inches. The device was subjected to water flow tunnel tests, and the differential pressure was measured between the dynamic pressure port channel and the static port channel. A plot of differential pressure versus flow velocity is seen in FIG. 7. The differential pressure increases in an approximately parabolic manner which readily allows interpolation of the velocity from the observed differential pressure. Thus, this device could be used as a flow meter or watercraft speedometer over this velocity range.

The device of the present invention can in principle be used as a fixed flow meter for determining the flow velocity of a fluid, or as a speedometer for a vehicle. As a flow meter, applications could include water flow monitoring in rivers, oceanography, etc., or in wells. As a speedometer, the present invention can in principle be used for airspeed measurement in airplanes, missiles, etc., or for water speed measurement in boats, submarines, torpedoes, etc. In principle, the device could be used in amphibious vehicles as well.

While particular embodiments of flow meter have been described, it is to be understood that the present invention is not limited to these embodiments. Various changes and modifications may be made without departing from the spirit and scope of the invention, as defined by the appended claims.

What is claimed is:

1. A fluid flow meter in the surface of a vessel, comprising:

a ramp connected to and extending longitudinally from a surface of a vessel exposed to fluid flow at a first end of the ramp to an opposite end of the ramp, said ramp inclined at a first angle to the surface to form a recess in the surface of the vessel;

a port member having a surface extending from said opposite end of the ramp, said dynamic port surface being oriented at a second angle to said ramp, wherein said second angle comprises less than about 180 degrees between said ramp and said surface, said surface having a dynamic port formed therein, the axis of said dynamic port oriented approximately parallel to said ramp; and a pressure measurement device connected to the dynamic port, for measuring the dynamic pressure caused by a flow of fluid in a direction roughly parallel to the surface of the vessel exposed to fluid flow.

2. The fluid flow meter of claim 1, further comprising:

a static port formed in the ramp, said static port connected to the pressure measurement device; and said pressure measurement device being a differential pressure measurement device for measuring the difference in pressure between the dynamic and static port.

3. The fluid flow meter of claim 1, further comprising:

a static port formed in the surface of the vessel, said static port connected to the pressure measurement device; and said pressure measurement device being a differential pressure measurement device for measuring the difference in pressure between the dynamic and static port.

4. The fluid flow meter of claim 1, said ramp having a cylindrical shape.

5. The fluid flow meter of claim 1, said ramp comprising two side walls having upper edges adjoining the surface of the vessel.

6. The fluid flow meter of claim 5, said ramp further comprising a floor connecting the lower edges of the two side walls.

7. The fluid flow meter of claim 6, said side walls being flat and perpendicular to the surface.

8. The fluid flow meter of claim 6, said side walls being curved and concave toward the exterior of the vessel.

9. The fluid flow meter of claim 6, said floor being curved and concave toward the exterior of the vessel.

10. The fluid flow meter of claim 6, said walls being flat and angled to the surface of the vessel so as to slope into the recess.

11. The fluid flow meter of claim 1, said first angle being greater than 0° and less than approximately 30°.

12. The fluid flow meter of claim 11, said first angle being less than approximately 7°.

13. The fluid flow meter of claim 1, said second angle being in the range of approximately 75° to 135°.

14. The fluid flow meter of claim 13, said second angle being in the range of approximately 90° to 110°.

15. The fluid flow meter of claim 1, said pressure measurement device being a micromachined diaphragm with embedded piezoresistive sensing elements.

16. The fluid flow meter of claim 2, said pressure measurement device being a micromachined diaphragm with embedded piezoresistive sensing elements.

17. The fluid flow meter of claim 5, said side walls converging toward the dynamic port surface.

18. The fluid flow meter of claim 5, said side walls diverging toward the dynamic port surface.

19. A fluid flow meter for installation in a vessel, comprising:

a housing for installing in a complementary hole in the vessel, said housing comprising:

a top surface of curvature matching the curvature of a surface of a vessel exposed to fluid flow;

a ramp connected to and extending from said top surface at a first end of the ramp longitudinally to an opposite end of the ramp, said ramp inclined at a first angle to the top surface to form a recess in the top surface;

a port member having a surface extending from said opposite end of the ramp, said surface being oriented at a second angle to said ramp, said second angle comprises less than about 180 degrees between said ramp and said surface, said surface having a dynamic port formed therein, the axis of said dynamic port oriented approximately parallel to said ramp;

a static port formed in the ramp; and a differential pressure sensor connected to said dynamic and static ports.

20. The fluid flow meter of claim 19, further comprising:

electrical leads extending from the pressure sensor to the interior of the vessel, for transmitting an electrical output of the sensor.

21. The fluid flow meter of claim 19, said housing further comprising:

an O-ring seal on a lower portion of the housing, for sealing the flow meter in the hole in the vessel.

22. The fluid flow meter of claim 19, further comprising:

the top surface of said housing being circular for fitting in a circular hole in the vessel.

23. The fluid flow meter of claim 22, further comprising:

said housing being rotatably mounted along the axis of the circular top surface; and the top surface of said housing further comprising a drag element, for allowing the housing to weathervane with changes in the fluid flow direction.

24. A method of measuring fluid flow velocity above the boundary layer and across the surface of an object, comprising the steps of:

providing a ramp connected to a surface of an object exposed to fluid flow inclined to the surface so as to form a recess;

providing a dynamic port in a port member having a surface extending from the recessed end of the ramp at an angle comprising less than about 180 degrees between said ramp and said surface;

determining a calibration of the dynamic pressure in the dynamic port as a function of known fluid flow velocity; and interpolating the value of an unknown fluid flow velocity from said calibration.

25. A method of measuring fluid flow velocity above the boundary layer and across the surface of an object, comprising the steps of:

providing a ramp connected to a surface of an object exposed to fluid flow inclined to the surface so as to form a recess;

providing a dynamic port in a port member having a surface extending from the recessed end of the ramp at an angle comprising less than about 180 degrees between said ramp and said surface;

providing a static port in the ramp;

determining a calibration of the differential pressure between the static and dynamic pressures as a function of known fluid flow velocity; and interpolating the value of an unknown fluid velocity from said calibration of the differential pressure.

* * * * *